United States Patent [19]

Robertson

[11] Patent Number: 5,083,380
[45] Date of Patent: Jan. 28, 1992

[54] DUCT NOTCHING TEMPLATE APPARATUS

[76] Inventor: Larry D. Robertson, P.O. Box 135, Edgewood, N. Mex. 87015-0135

[21] Appl. No.: 513,237

[22] Filed: Apr. 23, 1990

[51] Int. Cl.$^5$ .......................... G01B 3/30; B43L 13/00
[52] U.S. Cl. ........................................ 33/562; 33/485; 33/486; 33/464
[58] Field of Search .................. 33/562, 563, 565, 566, 33/567, 567.1, 571, 663, 679.1, 427, 428, 452, 464, 476, 477, 467, 474, 486, 669, 668, 484, 485

[56] References Cited

U.S. PATENT DOCUMENTS

| | | | |
|---|---|---|---|
| 1,116,512 | 1/1916 | Dannenfelser | 33/474 |
| 1,636,025 | 7/1927 | Waelde . | |
| 2,332,568 | 10/1943 | Gauthier . | |
| 2,632,250 | 3/1953 | Rauser . | |
| 3,834,033 | 9/1974 | Pinkard | 33/563 |
| 3,834,034 | 9/1974 | Berquist | 33/562 |
| 4,393,600 | 7/1983 | Coe | 33/474 |
| 4,507,869 | 4/1985 | Stude | 33/668 |
| 4,519,143 | 5/1985 | Correlli . | |
| 4,527,337 | 7/1985 | Dreiling | 33/562 |
| 4,644,663 | 2/1987 | Needs | 33/476 |
| 4,670,990 | 6/1987 | Horvath | 33/562 |
| 4,733,477 | 3/1988 | Fincham et al. | 33/476 |
| 4,825,559 | 5/1989 | Santos | 33/464 |

Primary Examiner—Allan N. Shoap
Assistant Examiner—C. W. Fulton
Attorney, Agent, or Firm—Robert W. Weig; Donovan F. Duggan; Deborah A. Peacock

[57] ABSTRACT

The disclosure relates to a duct notching template apparatus having slidably positionable and settable end templates and a center template. The end templates have hooked or tabbed edges for engaging the edge of a piece of sheet metal to be scribed for notching. The templates contain windows for viewing the measuring indicia on the longitudinal element on which they are disposed.

10 Claims, 4 Drawing Sheets

FIG—1

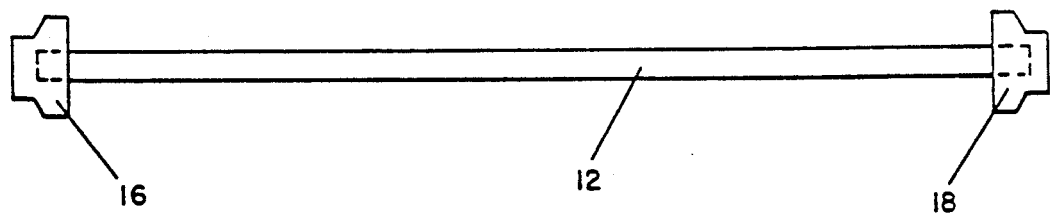
FIG—6a
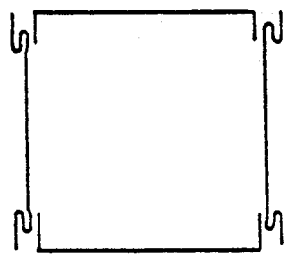
FIG—6b
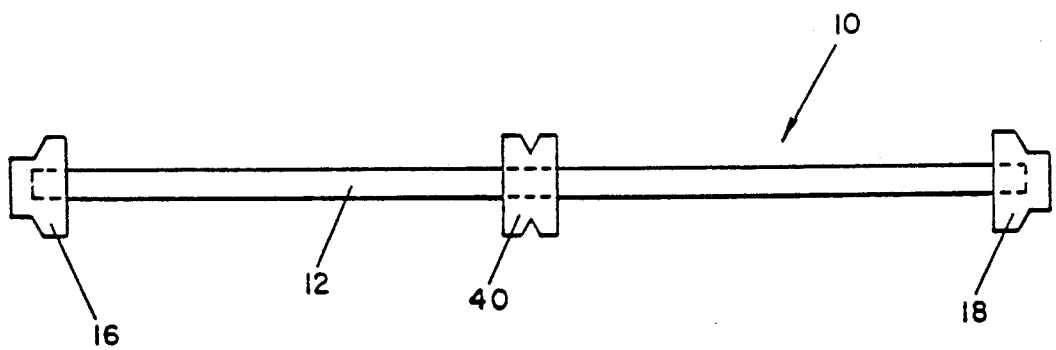
FIG—7a
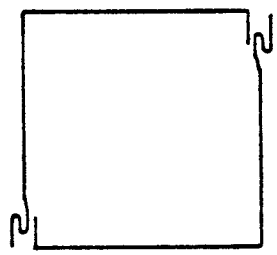
FIG—7b

DUCT NOTCHING TEMPLATE APPARATUS

BACKGROUND OF THE INVENTION

1. Field of the Invention (Technical Field)

The invention relates to sheet metal duct forming equipment and more particularly to sheet metal duct notching templates.

2. Description of the Related Art Including Information Disclosed under 37 C.F.R. §§1.97-1.99 (Background Art)

In manufacturing sheet metal ducts, they are made in one, two, three and four pieces, for example a complementary pair of "half wrap" ducts are cut and formed, and then fastened together. For each half wrap, a substantially rectangular piece of sheet metal, precut to size and called a "block-out," is marked, usually by scribing, for notching and folding. The scribing process is conventionally done manually in most sheet metal shops. At the present time the existing tool generally used is known as a circumference rule: simply a long metal ruler, containing measuring indicia and marked in inches in the United States. The circumference rule is used with an adjustable scribe, which is a separate tool. Too, some practitioners use L-squares, T-squares, tri-squares, combination squares, or other such devices in order to get notch consistency. Practitioners also use various types of notches, some of which are not compatible with others if placed to fit together. Some types of notches are used in order to save time. Other notch types are used to do a top quality job.

U.S. Pat. No. 2,632,250 to Rauser discloses a sheet metal layout device for inscribing sheet metal.

U.S. Pat. No. 1,636,025 to Waelde describes a sheet metal layout tool which utilizes diagonally disposed aperture arrays or matrices.

U.S. Pat. No. 2,332,568 to Gauthier discloses a tool for laying out sheet metal, having collars or bushings slidably mounted on a graduated bar for indicating the measurements of the pieces to be cut.

U.S. Pat. No. 4,519,143 to Correlli discloses a marker system for use in marking lines on sheet metal which is to be subsequently bent. Provision is made for marking from the left- or the right-hand margin.

U.S. Pat. No. 4,507,869 to Stude discloses a marker attachment for slidable mounting on an elongated rule and having provision for guiding a pencil or other marking device.

While these devices offer some desirable features, an apparatus in accordance with the instant invention offers ease of use, increased speed, certain accuracy, and is inexpensive to construct.

SUMMARY OF THE INVENTION

(Disclosure of the Invention)

In accordance with the present invention, there is provided a duct notching template apparatus comprising a longitudinal element having measuring indicia disposed thereon, a first end notch providing template slidably positionable on the longitudinal element, the first end template comprising structure for setting the template at a desired position on the longitudinal element, the first end template comprising at least one sheet metal hooking tab disposed on one side thereof; a second end notch providing template slidably positionable on the longitudinal element, the second end template comprising structure for setting the template at a desired position on the longitudinal element, the second template comprising at least one sheet metal hooking tab disposed on one side thereof; a third notch providing template slidably positionable on the longitudinal element, the third template comprising structure for setting the template at a desired position on the longitudinal element, whereby the first, second, and third templates on the longitudinal element are positionable on a piece of sheet metal desired to be cut with the tabs of the first and second end templates linearly aligned and substantially engaging one of the edges of the sheet metal piece so that the piece can be marked for notching. The first end, second end, and third templates preferably comprise sheet metal hooking tabs on either side thereof.

The third template preferably comprises a generally rectangular face having notch templates on either side thereof. The first and second end templates preferably each comprise outwardly facing truncated corner notch templates on either side thereof. Too, at least one, but preferably each of the templates comprise an aperture for reading the measuring indicia disposed on the longitudinal element. The template setting structures can comprise set screws. The template apparatus may further comprise two or more third notch providing template structures.

One object of the present invention is to provide consistent notches in the sheet metal used to manufacture ducts.

Another object of the present invention is to provide accurate notch placement on duct work.

One advantage of the present invention is that in accordance therewith, notch placement mistakes are minimized.

Another advantage of the present invention is that in accordance therewith, the tool of the invention can be utilized in forming ducts from block-outs longer or wider than the length of the apparatus of the invention.

Objects, advantages and novel features of the invention will in part be apparent from the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate several embodiments of the present invention and, together with the description, serve to explain the principles of the invention. In the drawings:

FIG. 4b shows a two piece duct formed by the embodiment of FIG. 4a; and

FIG. 5b shows a one piece duct formed by the embodiment of FIG. 5a; and

FIG. 6a is a top view of a fourth embodiment with no center template; and

FIG. 6b shows a four piece duct formed by the embodiment of FIG. 6a; and

FIG. 7a is a top view of the preferred embodiment; and

FIG. 7b shows a half wrap duct formed by the preferred embodiment of FIG. 7a.

DETAILED DESCRIPTION OF THE PREFERRED EMBODIMENTS OF THE INVENTION (Best Modes for Carrying out the Invention)

Figure 1:
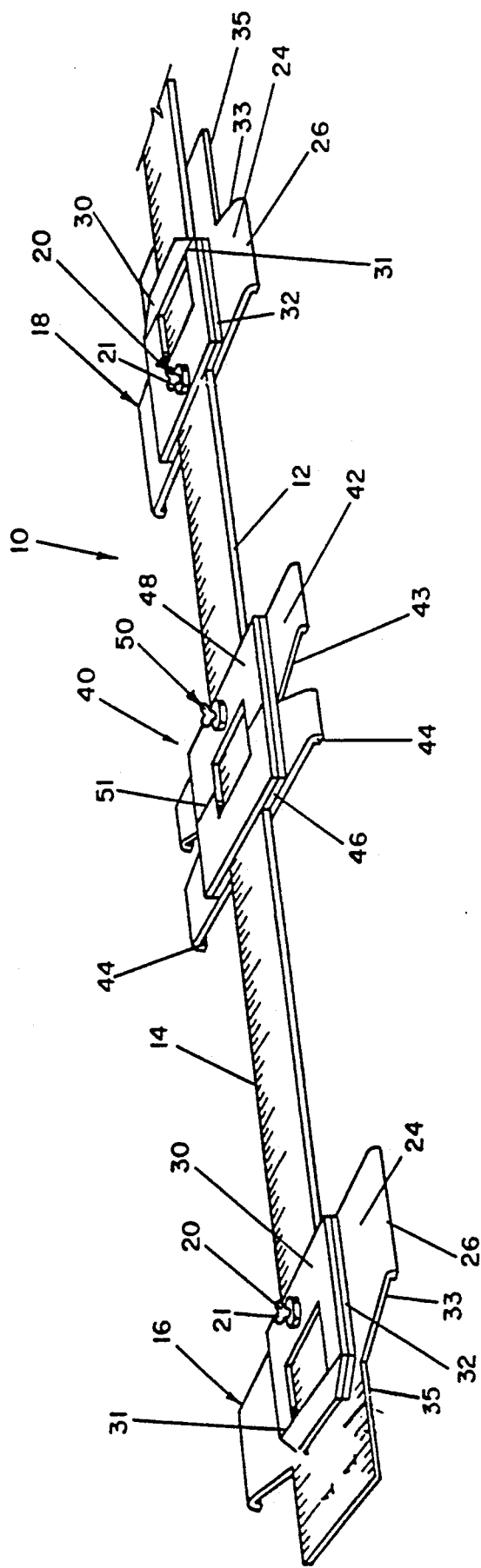
FIG. 1 is a perspective view of a preferred embodiment of the invention.
Figure 2:
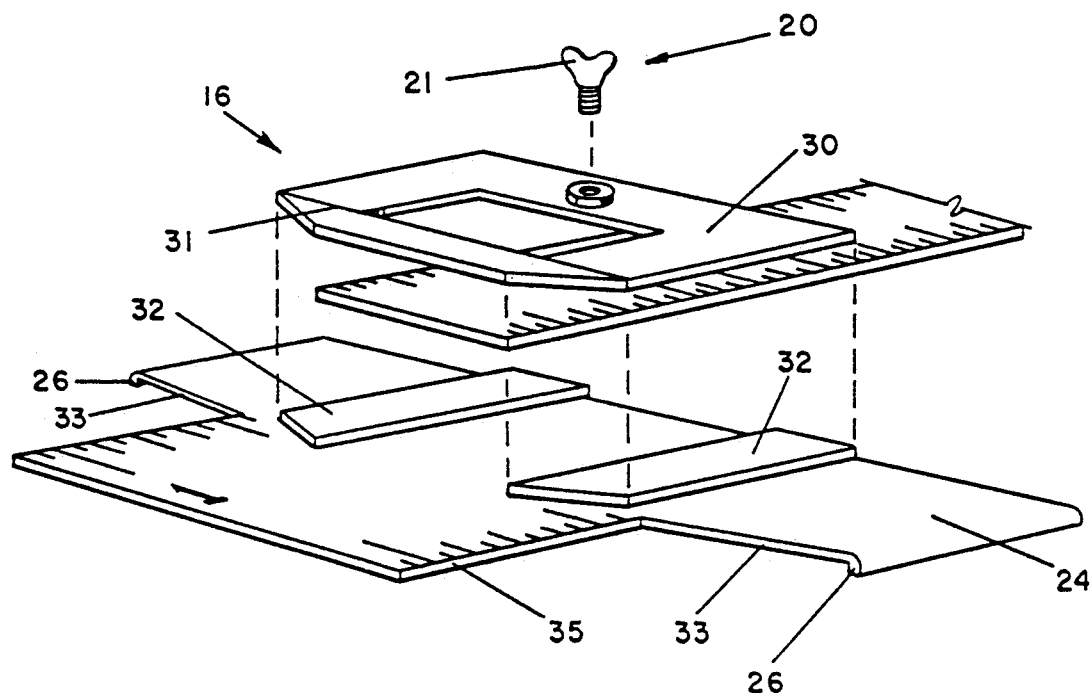
FIG. 2 is an exploded view of an end template of the preferred embodiment.

Reference is now made to FIG. 1 which shows a preferred embodiment of the invention 10 comprising a longitudinal element 12 having measuring indicia 14 inscribed, painted, etched or otherwise placed on one side thereof. In the preferred embodiment, longitudinal element 12 preferably comprises a conventional four-foot long metal circumference rule relatively narrow and of uniform width along its length, although element 12 can be of any length suitable to a particular application. A pair of novel end notch providing templates 16 and 18 slidably engage longitudinal element 12 along its relatively narrow body portion. Templates 16 and 18 are settable in any desired position using fixing means such as set screws 20, which preferably are flat, winged or the like so that a user can readily set, loosen and reset them by hand, without using a wrench, or other device or tool. As best seen in FIGS. 1 and 2, templates 16 and 18 each comprise a base 24 having sheet metal hooking tabs or flanges 26 which are engageable with the edges of a piece of sheet metal, such as a block-out, to be marked or scribed. Although tabs 26 are illustrated as continuously running the length of the edge of the base 24, one or more smaller tabs could extend from either side of base 24. Although tabs 26 are provided on the preferred embodiment, essentially any suitable sheet metal hooking means can be used. An aperture or window providing top plate 30 is mounted on two spacing and guide elements 32 which space top plate 30 from base 24 and guide the templates 16 and 18 along the longitudinal element 12. Set screw 20 with wing 21 or other flat surface suitable for finger leverage threads through top plate 30, and is used to set the template in a described position. The fit of each template on the longitudinal element 12 is such as to allow it to slide readily when its set screw is loosened; but it retains its alignment on the circumference rule for accuracy in use. Template 18 is preferably identical in construction to template 16. The outside edges 33 of the end templates 16 and 18 are truncated or angled back, as desired, to provide a predetermined notch template. Although a flat single angled template is shown, any suitable notch template can be provided. Indicator marks 31 are disposed as shown on templates 16 and 18. As shown in FIG. 2, edges 35 form the rest of the notch template with edge 33 and also in combination with measuring indicia thereon, provide for seam allowance measurement.

Templates 16 and 18 of the preferred embodiment provide up to 1½" seam allowance which is all that is required for most conduit and duct work. Those skilled in the art will appreciate that greater or lessor seam allowance can be provided in a particular embodiment to suit a user's particular needs.

In the preferred embodiment, the indicator mark 31 on template 16 is usually set on the zero on end of circumference rule 12. Thus, template 16 could be manufactured with a stop so mark 31 could be set on the zero mark of element 12. However, most users will appreciate the versatility of having it removably settable, the same as template 18.

Figure 3:
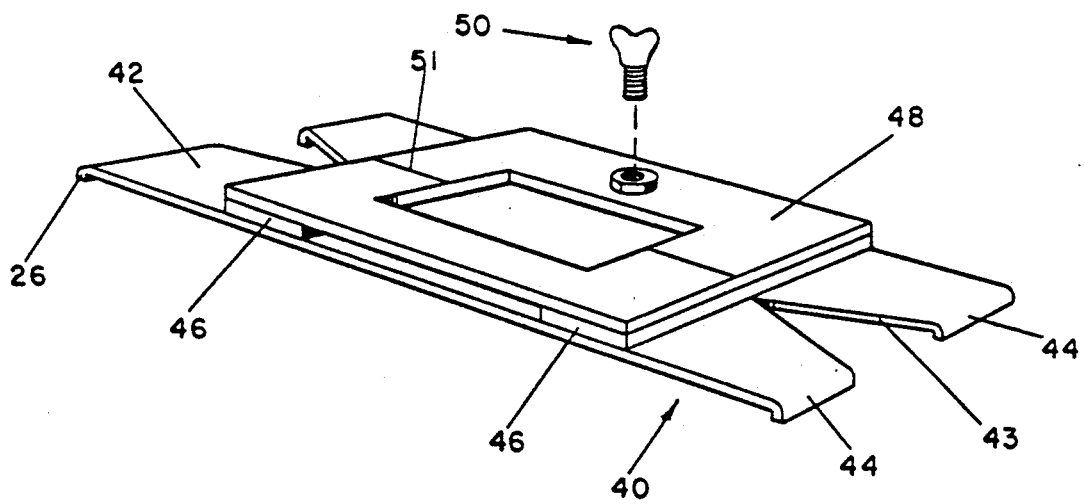
FIG. 3 shows the third or center template of the preferred embodiment.

As seen in FIGS. 1 and 3, a third or center template 40 comprises a base 42 having sheet metal notch templates 43 on either side thereof. The edges of center template 40 are preferably hooked with tabs 44, as shown. Spacers 46 support an aperture containing top plate 48 settable with set screw 50 threadable into top plate 48. Notch 43 can have any shape desired by a user. An indicator mark 51 is centered on notch 43 on base 42.

The parts making up templates 16, 18, and 40 can be welded together or affixed using epoxy, rivets or any other adhesive or mechanical devices.

In operation, a user can save considerable time using the preferred embodiment of an apparatus in accordance with the invention. The preferred embodiment is primarily of use in laying out notches for duct work manufacture and fittings on block-outs, pre-cut sheets of sheet metal which are usually folded once and form one-half of a duct. Block-outs need to be precut to a particular size to allow for seam allowance, seams being how the two halves of the duct are fitted together. There are several types of seams commonly used such as the Pittsburgh, the snap lock and the lap. A user knowing what size duct is to be formed can locate template 16 with its indicator marks set at the zero point on the circumference rule and seam allowance edges 35 extending therefrom. The center template 40 is then positioned at the point where the duct is to be folded using its set screw 50. Template 18 is set so that its indicator mark 31 is set where appropriate. For example, if a block-out for an 8" by 12" duct 7" long is to be measured, the block-out should be approximately 21¼" by 8" to allow for a Pittsburgh seam. Thus, the template 16 would be located with its indicator mark 31 set at zero on the circumference rule 12, the center template 40 would have its indicator mark 51 set on the 8" mark of the circumference rule and template 18 would have its indicator mark 31 set at the 20" mark on the indicator rule. A user would lay the hooked edges 26, 44, and 26, respectively, of templates 16, 40 and 18 on the edges of the block-out and if a 1" seam allowance was required on template 16, set the 1" mark on edge 35 at the edge of the block-out and measure to see if the seam allowance indicia on edge 35 would show that the block-out is 21¼" long. Thus, the preferred embodiment can be used to quickly determine whether a block-out is properly sized. Once the preferred embodiment is in place, a scratch-awl is used to scribe appropriate lines on the block-out using the notches provided by templates 16, 18 and 40. The use of the templates standardizes the notches and they are easily scribed using a simple awl. Once one side of the block-out is scribed, the apparatus is simply slid across the block-out and the other side of the block-out is similarly scribed using the notches on the templates on the other side of the preferred embodiment. This sliding of the apparatus from one side of the block-out to the other eliminates mistakes in marking notches on duct work that frequently occurs in the prior art when the block-out is turned 180 degrees, as is typically done, in order to scribe the other side of a block-out, which frequently results in misaligned center notches.

Figure 4A:
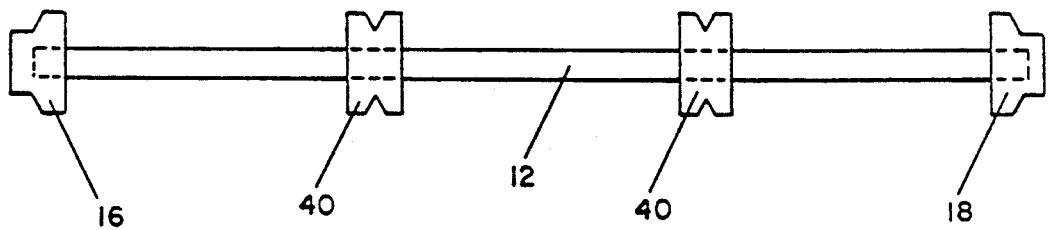
FIG. 4a is a top view of a second embodiment with two center templates.
Figure 4B:
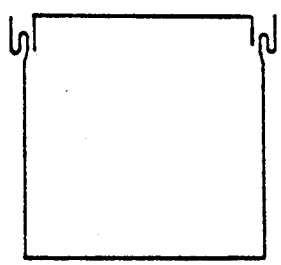
Figure 5A:
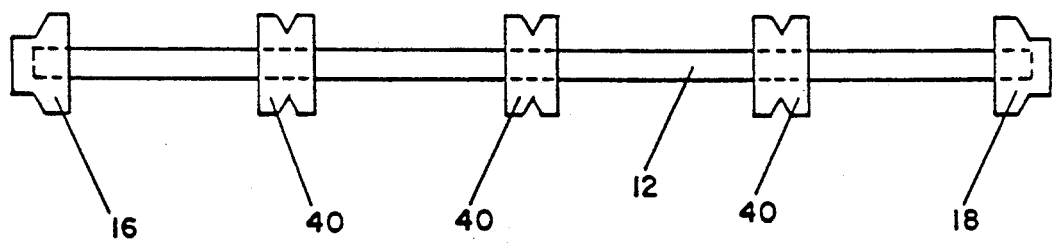
FIG. 5a is a top view of a third embodiment with three center templates.
Figure 5B:
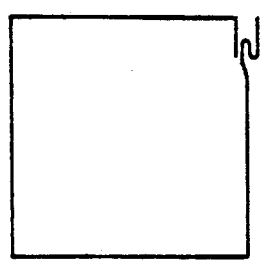

End templates 16 or 18 can be used independently without a circumference rule as a template for end notches or any block-out, if desired. Those skilled in the art will realize the templates can be used in many other ways. Two center templates 40 as seen in FIG. 4a, can be used to construct the two piece FIG. 4b duct. Three center templates 40 as seen in FIG. 5a, can be used to construct a one piece duct as seen in FIG. 5b, and end templates 16 and 18 as seen in FIG. 6a can be used to construct a four piece duct as seen in FIG. 6b. FIG. 7a shows the preferred embodiment and a half wrap duct, as shown in FIG. 7b formable therewith.

In addition to using a template to scribe notches on half-wrap duct, the templates can be used to scribe notches on duct to which a connection is to be added, such as a DUCT MATE connection. By setting template 40 on circumference rule 12 to either edge thereof, it can be used to scribe a line across the end of the block-out or a mark perpendicular to the bottom and perpendicular to the circumference rule. This mark will show where the metal is to be bent to form the end of the duct for the connection.

Another advantage of the invention is that the templates 16, 18 and 40 can be arranged so that they can be used to scribe notches on ducts made from block-outs larger than the length of the circumference rule being used. For example, a 24" by 36" duct requires a 60" long (plus seam allowance) block-out. Circumference rule 12 is 48" long. Template 16 is positioned on rule 12 as previously, with its indicator mark set on zero on the circumference rule. Template 18 is then slide onto the rule with its notched templates positioned in the same direction as those on template 16, unlike in the previous example where the notches on templates 16 and 18 at either end of the circumference rule faced outward. The dimension at which templates 18 is set is at the difference between the two dimensions of the duct. For example, on the 24" by 36" duct, subtract 24" from 36" and obtain 12". Thus template 18 is set at the 12" mark, the indicator mark 31 on template 18 being set at the 12" mark on the circumference rule 12. Then, center template 40 is positioned on the circumference rule 12 with its indicator mark 51 at the largest dimension of the duct to be constructed, i.e., at the 36" mark. The hooked edges of the templates are placed against the bottom edge of the block-out to be notched. Circumference rule 12 is now slid out to where template 18 is placed at its position for proper seal allowance and the notch is scribed from template 18 as well as template 40. Now the preferred embodiment is turned 180 degrees or end-for-end so that template 16 is on the other side of the block-out from where it had previously been. Template 40 is lined up on the mark just scribed using the other side of template 40. The user then scribes again with template 16, but from the other side.

The invention has been described in detail with particular reference to a preferred embodiment thereof, but it will be understood that variations and modifications can be effected within the scope of the invention.

What is claimed is:

1. Template apparatus for scribing sheet metal for duct forming and the like comprising:
    a longitudinal element having measuring indicia disposed thereon;
    first notch providing template means slidably positionable on said longitudinal element, said first template means comprising means for setting said first template means at a desired position on said longitudinal element, said first template means comprising at least one hooking tab disposed on one side thereof for engaging an edge of a piece of sheet metal;
    second notch providing template means slidably positionable on said longitudinal element, said second template means comprising means for setting said second template means at a desired position on said longitudinal element, said second template means comprising at least one hooking tab disposed on one side thereof for engaging an edge of a piece of sheet metal;
    third notch providing template means slidably positionable on said longitudinal element, said third template means comprising means for setting said third template means at a desired position on said longitudinal element, said third template means comprising at least one hooking tab disposed on one side thereof for engaging an edge of a piece of sheet metal, whereby said first, second, and third template means on said longitudinal element are positionable on a piece of sheet metal desired to be cut with said tabs of said template means being linearly aligned to substantially engage one of the edges of the sheet metal piece so that the piece can be marked for notching.

2. The invention of claim 1 wherein said first, second, and third template means each comprise hooking tabs on either side thereof.

3. The invention of claim 1 wherein third template means comprises a generally rectangular face having notch templates on either side thereof.

4. The invention of claim 1 wherein said first and second template means each comprise an outwardly facing truncated corner notch template on either side thereof.

5. The invention of claim 1 wherein at least one of said template means comprises aperture means for reading said measuring indicia disposed on said longitudinal element.

6. The invention of claim 1 wherein each of said template means comprises aperture means for reading said measuring indicia disposed on said longitudinal element.

7. The invention of claim 1 wherein at least one of said template setting means comprises a set screw.

8. The invention of claim 1 wherein each of said template setting means comprises a set screw.

9. The invention of claim 1 wherein said apparatus comprises two or more third notch providing template means.

10. The invention of claim 1 wherein said first and second template means each further comprise seam allowance measurement means thereon.

* * * * *